United States Patent [19]
Williams, Jr.

[11] Patent Number: 4,588,196
[45] Date of Patent: * May 13, 1986

[54] TORSION SUSPENSION SYSTEM FOR MOTORCYCLES HAVING IMPROVED CENTER OF GRAVITY

[75] Inventor: John E. Williams, Jr., Duquesne, Pa.

[73] Assignee: AAKAC Industries Inc., Apollo, Pa.

[*] Notice: The portion of the term of this patent subsequent to May 29, 2001 has been disclaimed.

[21] Appl. No.: 613,258

[22] Filed: May 23, 1984

Related U.S. Application Data

[63] Continuation-in-part of Ser. No. 389,664, Jun. 18, 1982, Pat. No. 4,451,065.

[51] Int. Cl.⁴ .................. B62K 25/28; B60K 15/00
[52] U.S. Cl. ............................. 280/5 A; 180/219; 280/284
[58] Field of Search ............... 180/227, 219; 280/5 A, 280/202, 284, 289 A, 289 R, 285, 664, 695, 700, 721; 267/57

[56] References Cited

U.S. PATENT DOCUMENTS

| | | | |
|---|---|---|---|
| 3,698,503 | 10/1972 | Koyama | 180/219 |
| 4,451,065 | 5/1984 | Williams, Jr. | 280/284 |
| 4,457,524 | 7/1984 | Yoshiwara | 280/5 A |
| 4,465,156 | 8/1984 | Richardson et al. | 280/284 |

*Primary Examiner*—Joseph F. Peters, Jr.
*Assistant Examiner*—Donn McGiehan

[57] ABSTRACT

A motorcycle having improved center of gravity is disclosed. The motorcycle has a torsion suspension system and a frame having front and rear wheels with a motor located in the frame and a driver's seat mounted on an upper supporting structure of the frame. A swing arm having a pivot point on one of the frame and the motor is provided, the swing arm having at least one arm supporting a wheel, the swing arm permitting the wheel to rotate about a generally horizontal axis and to move in a generally vertical direction with respect to the pivot point axis of said swing arm. A fuel tank is provided having at least a portion thereof fixedly mounted in said frame below said driver's seat, thereby improving said motorcycle center of gravity by providing for lowered weight.

18 Claims, 11 Drawing Figures

TORSION SUSPENSION SYSTEM FOR MOTORCYCLES HAVING IMPROVED CENTER OF GRAVITY

This is a continuation-in-part of my U.S. Ser. No. 389,664, filed 6-18-82, now U.S. No. 4,451,065.

This invention relates to suspension systems and more particularly it relates to suspension systems for two and three wheeled vehicles such as cycles, tricycles and motorized versions of such vehicles.

In conventional suspension systems used for providing the rear wheel of a motorcycle, for example, with up and down travel for purposes of riding comfort and stability, hydraulic shock absorbers with helical or coiled springs surrounding the shock absorber have been used and traditionally have been mounted on a swing arm which carries the rear wheel, the placing of one end of the shock absorber on the swing arm being in the vicinity of the rear wheel axle, the opposite end being mounted or secured to the motorcycle frame. However, one of the disadvantages of mounting the shock absorber on the swing arm close to the axle is that increased wheel travel can normally only be gained with longer shock absorbers. To offset this problem the spring/shock absorber combination have been mounted away from the rear wheel axle towards the swing arm pivot point and thus the rear wheel could travel up and down with the travel of the shock absorber only being required to be a portion of the rear wheel travel. However, even with the shock absorbers mounted in this position, the suspension still retained the disadvantage of having a relatively constant rate of compression; that is, the same amount of force is required to compress the spring/shock absorber a given distance at the start of the travel as required towards the end of the travel. This led to the use of single spring/shock absorbers mounted with the use of linkage to require only light loads or small forces to compress the shock absorber in the initial travel of the rear wheel and requiring greatly increased loads towards the end of the rear wheel travel. This system ensures that the rear wheel suspension would respond readily to small bumps or undulations in the topography in its initial travel but would not bottom on large bumps when greater forces are transmitted to the spring/shock absorber. Such a suspension system is illustrated in U.S. Pat. No. 3,907,332. However, while this type of suspension system improves riding comfort and stability, it suffers from the disadvantage of earlier suspension systems by keeping weight of the motorcycle relatively high, normally above its center of gravity, and total weight of the suspension is increased because of the use of the linkage. This detracts from stability with respect to balance; that is, top heaviness becomes somewhat more exaggerated as the distance of this weight from the ground is increased by virtue of longer suspension, for example. From the above, it will be appreciated that weight, in the form of suspension components e.g. linkage added to a motorcycle above its center of gravity, will detract from balance.

A further problem inherent in the design of the conventional shock absorber/helical spring combination, regardless of mounting position, is that tuning of the shock absorber and helical spring is not easily separable. That is, the compression of the spring and shock absorber is effected at the same rate. Further, the shock absorber usually has to be constructed with a certain rigidity in order to withstand the forces resulting from the compression of the spring, all of which adds unnecessary weight.

The present invention resolves all of these disadvantages by providing a suspension system which in a motorcycle, for example, can put the suspension weight below the center of gravity and permits the shock absorber to be designed with respect to its use and not the use of a spring component. Additionally, these benefits can be obtained without compromise with respect to the quality of ride whether the vehicle be used in competition where vigorous demands are made on the suspension components or whether the vehicle be used for touring or commuting where demands are relatively mild. Thus, it will be appreciated that the present invention, since it provides these benefits without compromise or without adding undesirable high weight, results in a marked advance in the art of suspension systems, particularly with respect to two or three-wheeled vehicles such as motorcycles.

SUMMARY OF THE INVENTION

An object of the invention is to provide a suspension system suitable for use on bicycles such as motorcycles and motorized tricycles and the like.

Another object of this invention is to provide a torsion bar suspension for bicycles and tricycles such as motorcycles and motorized tricycles.

Yet another object of this invention is to provide a torsion bar suspension having a rising or progressive force rate for motorcycles and motorized tricycles.

And yet another object of this invention is to provide a suspension system comprising at least one torsion bar and a separately tunable hydraulic shock absorber.

And still a further object of this invention is to provide a suspension system comprising at least one torsion bar and linkage means connected thereto and to the swing arm in a way which produces decreasing leverage and an apparent increase in the spring rate in the torsion bar in response to displacement of the wheel.

In accordance with these objects there is provided a suspension system suitable for bicycles, motorcycles and motorized tricycles. The suspension system includes a frame which may have a generally closed loop shape with a swing arm pivotally mounted or secured to the frame or to a motor carried in the frame. The swing arm has preferably two arms for supporting the wheel in a generally horizontal axis, which permit the wheel to rotate about the axis. Further, the swing arm permits the wheel to be displaced in a generally vertical direction and in an arc defined by the swing arm. A torsion bar suspension member having a first part or first end portion and a second part or second end portion is secured to or carried by the frame at the first part. A lever arm having a first end and a second end has its first end rigidly secured to the second portion of the torsion bar. A linkage means is provided and includes a member which can be pivotally fastened to both the swing arm and to the second end of the lever arm. The swing arm, linkage means, lever arm and torsion bar are connected such that movement of the swing arm displaces the linkage means thereby forcing the lever arm to twist the torsion bar to provide a spring action. The linkage means and arm member are connected in a configuration or geometry which provides decreasing leverage as the swing arm is deflected upwardly, resulting in an apparent increase in the torsion bar spring rate. In a preferred embodiment, a shock absorber is mounted on the linkage means so as to provide an increase in the rate of damping in response to the wheel displacing or deflecting the swing arm in a generally upwardly direction.

DETAILED DESCRIPTION OF THE PREFERRED EMBODIMENTS

Figure 1:
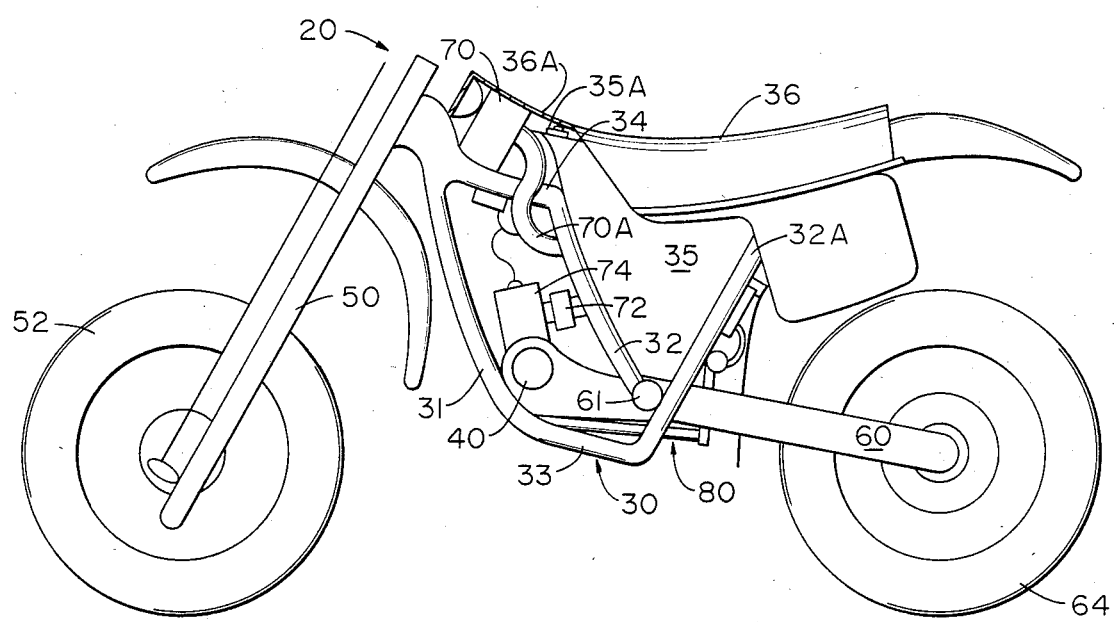
FIG. 1 is a side elevation view of a motorcycle schematically illustrating the use of the torsion suspension system and a portion of a gas tank located under a seat in accordance with the present invention.

In FIG. 1 there is shown a motorcycle, referred to generally as 20, and schematically illustrated thereon is a torsion suspension system 80 in accordance with the present invention. The motorcycle includes a frame 30 which, in FIG. 1, has the general configuration of a parellelogram having sides 31 and 32 and having a bottom side 33 and a top side 34 which carries an air cleaning element 70. Frame 30 provides a cradle for motor 40. In addition, there is provided a juncture or steering head mounted generally where sides 31 and 34 are joined, the steering head providing for attaching telescopic forks 50 which carry front wheel 52. A support member 32A is provided to carry seat 36. At the rear of the frame, swing arm 60 carries rear wheel 64 and is pivotally secured or mounted at point 61. This permits the rear wheel and swing arm to be displaced upwardly and downwardly with respect to frame 30 in response to undulations or bumps or ruts in the topography or terrain over which the wheel may roll. Torsion rod or bar suspension system 80 is shown attached at about the juncture of side 33 and side 31 of the frame and to swing arm 60 and carried on a bearing member 88 (FIG. 2) to provide resiliency or spring action to the rear wheel as it rolls over terrain, the suspension system to be described in greater detail hereinbelow. That is, as the rear wheel rotates in swing arm 60, the swing arm and wheel as a unit are displaced or deflected generally upwardly or downwardly in response to ruts or rocks or other uneveness encountered on the terrain over whick the rear wheel rolls. The ability of the swing arm to move in this fashion adds greatly to riding comfort, particularly when the swing arm is sprung with respect to the frame and the proper amount of spring damping is provided by a properly tuned hydraulic shock absorber.

While the frame has been described hereinabove with respect to the general shape of a parallelogram, it should be noted that for purposes of the present invention its application is not necessarily limited thereto. That is, use of the present torsion suspension system only requires mounting points. For this purpose, the motor may provide such mounting points, particularly where the motor is used as a stress member. Thus, it will be understood that the bottom of the motor, for example, may provide mounting points at the forward end (the torsion bar end away from the end connected to the swing arm) of the torsion bar and further the motor may provide for mounting or bearing points near where the torsion bar is connected to the swing arm. These mounting points can be conveniently provided on the cases during fabrication or casting thereof. Further, while in FIG. 1 torsion bars of the suspension system 80 are shown mounted substantially horizontally and in the direction in which the motorcycle travels, it should be understood that other mounting positions such as generally perpendicular, for example, with respect to the swing arm point or any convenient angle between perpendicular and parallel to the swing arm pivot point. While it may not be desired to mount a single torsion bar concentric with or parallel to the swing arm pivot axis because such mounting normally results in very short torsion bar lengths and therefor limited travel, angles at as little as 5° from the swing arm axis can be utilized since such angle permits the torsion bar to be directed so as to provide for greater lengths. Thus, it will be seen that the torsion bar mounting with respect to the axis of the pivot point can be at an angle in the range of about 10° to 170° with preferred angles, as currently understood, being in the range of 60° to 120° with a typical angle being generally about 90° or substantially perpendicular to the axis of the swing arm pivot point. For example, the torsion bar may be mounted generally parallel to frame side 32, but this is a less preferred mounting position since this can result in weight being added above the center of gravity. Similarly, the torsion bar may be mounted on the swing arm or inside the legs of the swing arm for protection as will be explained more fully below. Further, combinations may be used, ie. one torsion bar may be mounted underneath as shown in FIG. 1 and one may be mounted generally vertically with respect to the swing arm pivot point. However, as presently understood the preferred mounting position is similar to that shown in FIG. 1 because it lowers the center of gravity and consequently increases stability and handling because of its low weight distribution, particularly when compared to conventional systems where a large part of the weight is above the center of gravity, which is normally above the swing arm.

In addition to the above, it will be seen that struts or supports, e.g. for seat, may be mounted on the frame in the conventional manner without having to be specially designed for the present torsion suspension system. In recent developments in spring and shock absorber combinations, air filter box 70 is mounted off center and carburetor 72 is mounted on the engine barrel 74 at an angle, all of which greatly makes servicing of such components extremely difficult. Further, sides 32 of frame 30 normally have to be formed so as to provide greater space for the conventional spring/shock absorber and such forming or resulting bulk makes side member 32 protrude so as to interfere with the riders stance, for example, when it becomes necessary to stand on the foot pegs. Further, the mounting of the suspension system of the present invention has the advantage that frame members such as 32 and 34 may be fabricated from considerably lighter weight material since they are not severely stressed as in mounting of conventional spring/shock absorber combinations which reduces weight of the motorcycle and again facilitates balance and handling.

With respect to frame 30, it will be understood that twin sides are often provided particularly with respect to bottom members 33 and side members 32. However, side member 31 can be single component, usually depending on the manufacturer and as explained earlier, bottom member 33 and a large portion of 31 can be removed if the motor is used as a stress member.

Figure 2:
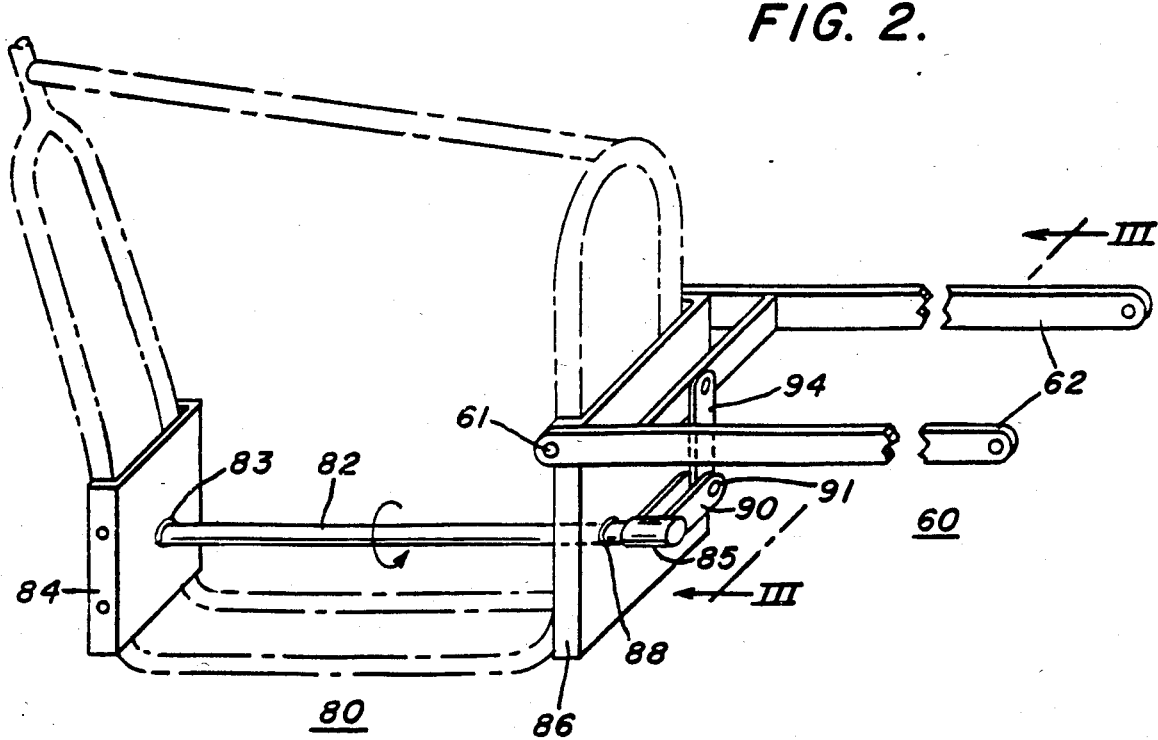
FIG. 2 is a perspective view illustrating the torsion suspension system and showing the mounting of the system on a motorcycle frame.
Figure 3:
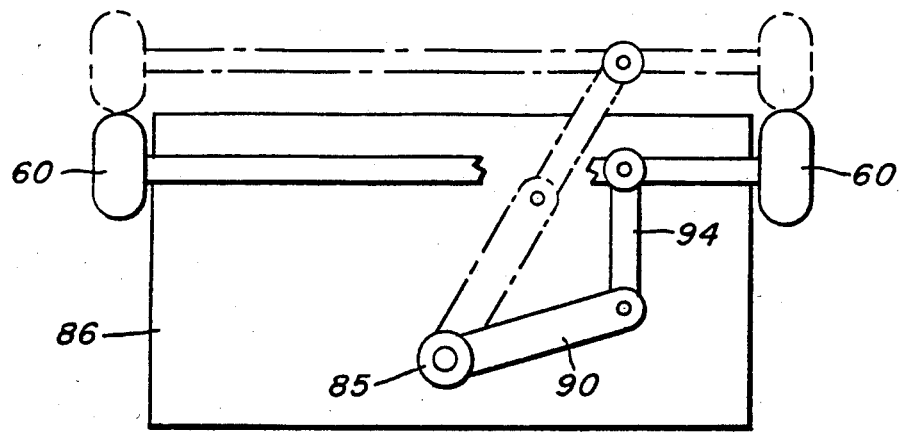
FIG. 3 is a view along the line III—III of FIG. 2.

Turning now to FIG. 2, there is illustrated one embodiment of torsion suspension 80 of the present invention and a method of mounting such to a motorcycle frame (shown with broken lines) having twin sides and bottom members and to a swing arm 60 of the type having two parallel arms 62 which carry the rear wheel. The suspension system comprises a torsion rod or bar 82 having a first part thereof securely connected to frame member 84. Torsion bar 82 extends rearwardly therefrom through frame member 86 wherein it is rotatably supported or carried by a bearing 88. Torsion bar 82 has a second part 85 which extends past swing arm pivot point 61. However, it will be appreciated that torsion bar 82 does not have to extend past the swing arm pivot point but may be shorter than the configuration which is shown in FIG. 2. An extension may be provided on the swing arm past its pivot point with a connection being made to the torsion bar with similar results obtained as for the configuration shown in FIG. 2. An arm member or lever arm 90 has a first end thereof securely fastened or connected to second part 85 of the torsion rod and in the view shown in FIGS. 2 and 3 extends substantially horizontally therefrom at about 90°. It will be understood that other angles may be employed and further it will be understood that the connection to second part 85 may be a spline or hex shape connection which provides for ease of preloading the torsion bar.

Linkage means 94 pivotally connects second end 91 of arm member 90 to swing arm 60. That is, linkage means 94 is pivotally connected to both the swing arm and second end 91 of the arm member. Arm member 90 may be a double member as shown or may have a double end to provide rigidity to the system. Further, linkage means 94 may be directly pivotally connected to one arm of the swing arm or may be connected to one or two cross members connecting the arms of the swing arm. It should be understood that the linkage means is rotatably connected at either end and also should be mounted so as to permit the linkage means to pivot because the swing arm connection with the linkage means may be moved forward as the swing arm is deflected upwardly. In addition, linkage means 94 may be adjustable with respect to length in order to adjust or tune the amount of preload which may be desired in the suspension system. Further, it will be appreciated that the dimensions of torsion bar 82, e.g. length and length of arm member 90 relate to softness of harshness of ride for a given torsion bar, i.e. softness or stiffness of the torsion bar spring rate. Thus, with respect to arm member 90, it may be provided with an adjustable length in order to easily adjust or tune the spring for the type of terrain without removal from the frame or exchanging torsion bars.

Arm member 90 and linkage means 94 are important features of the present invention in that preferably they are connected to provide a rising rate with respect to the spring rate of the torsion bar. That is, as the rear wheel swings the swing arm generally upwardly about its pivot point, the swing arm lifts linkage means 94 which in turn lifts arm member 90 which twists the torsion bar. As the swing arm lifts the linkage means, the effective length of arm member 90 is decreased (see FIG. 3) which provides the rising spring rate, an apparent increase in the spring rate of the torsion bar. That is, as the swing arm is displaced upwardly by the wheel, the leverage ratio on the torsion bar decreases. This provides a suspension which is very soft at the initial travel to provide a very smooth ride over small bumps. Yet when large bumps are encountered and the wheel deflects or displaces the swing arm substantially, the effective spring rate of the torsion bar increases and prevents the rear wheel from bottoming on the fender. Thus, it will be seen that there is an apparent increase in the spring rate as the wheel is displaced upwardly.

Figure 4:
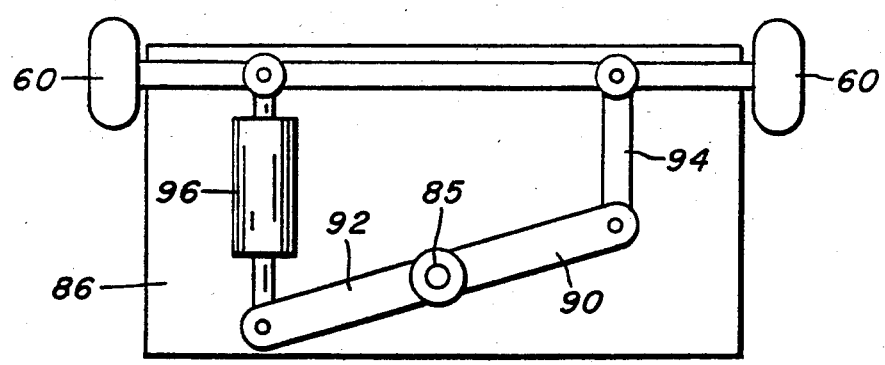
FIG. 4 is a view of the suspension system similar to that of FIG. 3 showing a shock absorber mounting position.

For purposes of damping out oscillations set up by the torsion suspension, a hydraulic shock absorber may be added as shown in FIG. 4, for example. One end of the shock may be mounted to arm member 92 and the other end may be mounted to the swing arm in a manner similar to that for linkage means 94. It will be appreciated that the progressiveness of rate of damping in the shock absorber can be separate from that of the torsion bar and that the shock absorber can be mounted depending on the linkage to have its rate of damping faster or slower than the torsion bar, Further, in this arrangement, unlike conventional suspension, the shock absorber can be much lighter and smaller since it does not have to carry a coiled spring as in most conventional systems.

Figure 5:
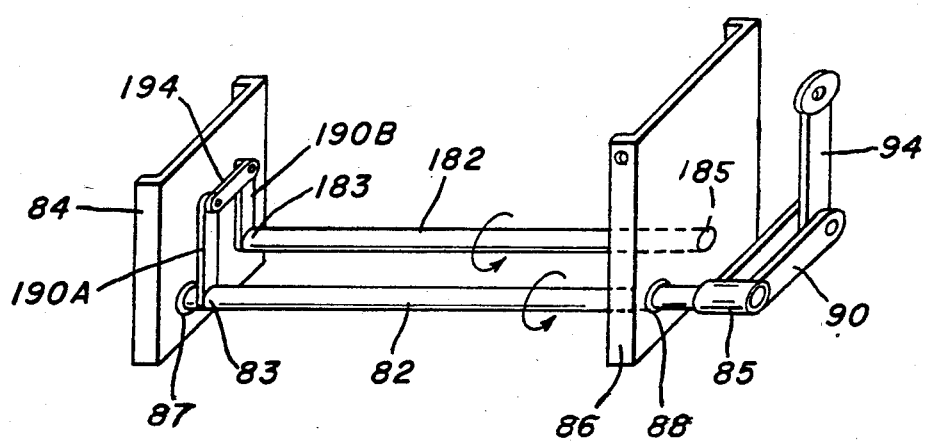
FIG. 5 is a perspective view illustrating another aspect of the torsion suspension system in accordance with the present invention.

In FIG. 5, there is shown an alternate embodiment, in which at least a second torsion bar 182 is provided and mounted substantially parallel to first torsion bar 82. End 85 of torsion bar 82 is provided with the same arm member 90 and linkage means 94 and carried at end 85 on bearing 88 on frame member 86 and additionally, torsion bar 82 is carried at the end 83 on bearing 87. Also, torsion bar 182 is mounted on frame member 84 on a bearing and fastened or connected rigidly to frame member 86. Both torsion bars are connected to arm members 190A and 190B which are rotatably or pivotally connected by linkage means 194. This system provides the advantage of a longer torsion bar.

Alternately, both ends 83 and 183 of torsion bars 82 and 182 may be rigidly mounted on frame member 84, with end 185 of rod 182 being carried in a bearing in frame member 86. Arm members 190A, 190B and linkage 194 may be fastened on torsion bars 82 and 182 near frame member 86. With torsion bars 82 and 182 being the same or different rates, additional progressiveness can be designed into the suspension system of the present invention. It will be understood that linkage 190A, 190B and 194 may be set up so that torsion bar 182 only becomes at least substantially effective when the swing arm has traversed 50% of its travel, for example. Further, it will be understood that a longer torsion bar effect can be obtained by having concentric torsion bars.

Figure 6:
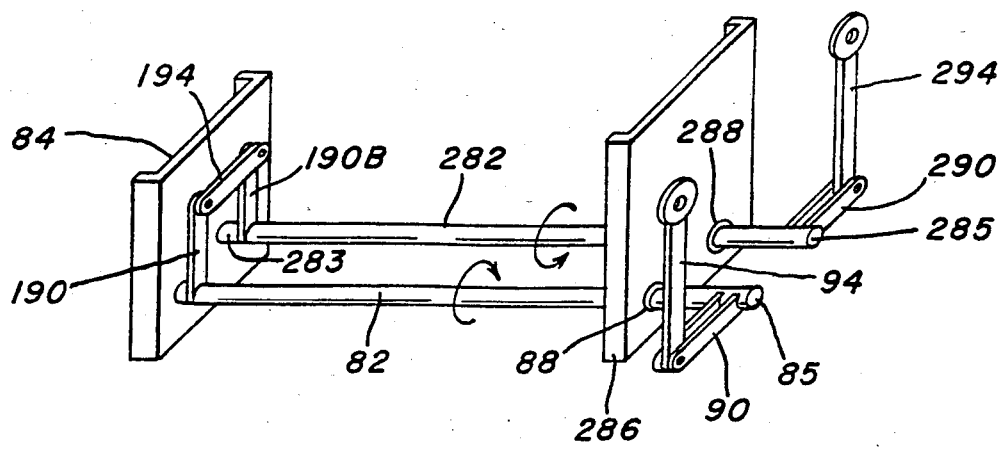
FIG. 6 is another perspective view showing a further embodiment of the present invention employing two torsion bars.

Referring now to FIG. 6, there is shown a torsion suspension system in accordance with the present invention wherein two torsion rods are used with two actuating systems. Thus, in this system there is provided tosion bar 82 which is carried by a bearing 88 and which is rigidly mounted or secured to frame member 84. An arm member 90 is mounted securely to torsion rod 82 at end 85 and linkage means 94 pivotally or rotatably mounted on arm member 94 with its other end adapted to be rotatably mounted to the swing arm. A second torsion bar 282 is mounted generally parallel to torsion bar 82 as shown in FIG. 6. Torsion bar 282 is securely connected to frame member 84 at end 283 and is carried on bearing 288 in frame member 286. At end 285 of torsion bar 282, arm member 290 is mounted securely and linkage means 294 is pivotally or rotatably mounted on arm member 290 at one end thereof. The other end of linkage means 294 is adapted to be pivotally or rotatably mounted to the swing arm.

In the embodiment shown in FIG. 6, linkage means may be constructed so as to provide linkage means 94 and 294 in a generally parallel manner as shown. Or arm members may be mounted so as to produce a more progressive rising rate. That is, arm member 290 and linkage 294 may be arranged to provide a greater amount of rising rate during the last portion of rear wheel travel than that of arm member 90 and linkage means 94.

In the embodiment shown in FIG. 6 arm member 190A and 190B may be mounted on torsion bars 82 and 282 substantially as shown in FIG. 6. An adjustable member 194 can be provided to connect arm members 190A and 190B. Adjustable member 194 can be adjusted so as to provide a pre-loaded condition on the torsion bars.

Figure 7:
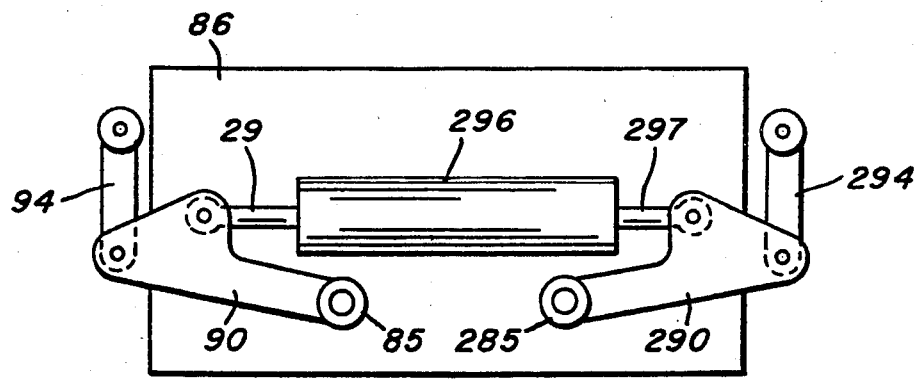
FIG. 7 is a view of the suspension system similar to that shown in FIG. 6 showing a hydraulic shock absorber mounted so as to provide an increasing or rising damping or rebound damping characteristic.

In FIG. 7 there is shown a mounting position of a shock absorber 296 which may be used with twin or double torsion bars 85 and 285 to provide damping which has a rising rate. Shock absorber 296 is provided with shaft 29 and 297 which are connected to arm members 90 and 290. Shafts 29 and 297 may be connected to arm members 90 and 290 as shown; however, it will be evident that other mounting positions can be used, depending to some extent on the amount of damping and the rate of damping or rebound damping desired. It will be understood that by rising damping rate is meant that the rate with which shaft 297 travels or is moved into the shock absorber body increases as the rear wheel is displaced upwardly. That is, the damping of the shock absorber can be arranged to increase significantly in the last half of the wheel displacement as compared to the first half of the wheel's displacement. Thus, it can be seen that with this arrangement the shock absorber can be set to both accomodate or provide a soft or smooth suspension in the initial displacement of the wheel and a much stiffer damping or rebound damping in the last part of the wheel displacement. Shock absorber mounting positions such as shown, for example, in FIG. 7, keep weight low which greatly facilitates stability and handling as noted hereinabove.

A shock absorber which can be used on the present invention may have a body, e.g. 296, with a cylindrical bore and a piston (not shown) connected to shaft 297. Shaft 29 may be firmly connected to body 296. Thus, in operation shaft 297 would slidably push the piston along the bore requiring hydraulic liquid or fluid contained in the shock to pass through the piston and thereby dampen out oscillations in the suspension.

Figure 8:
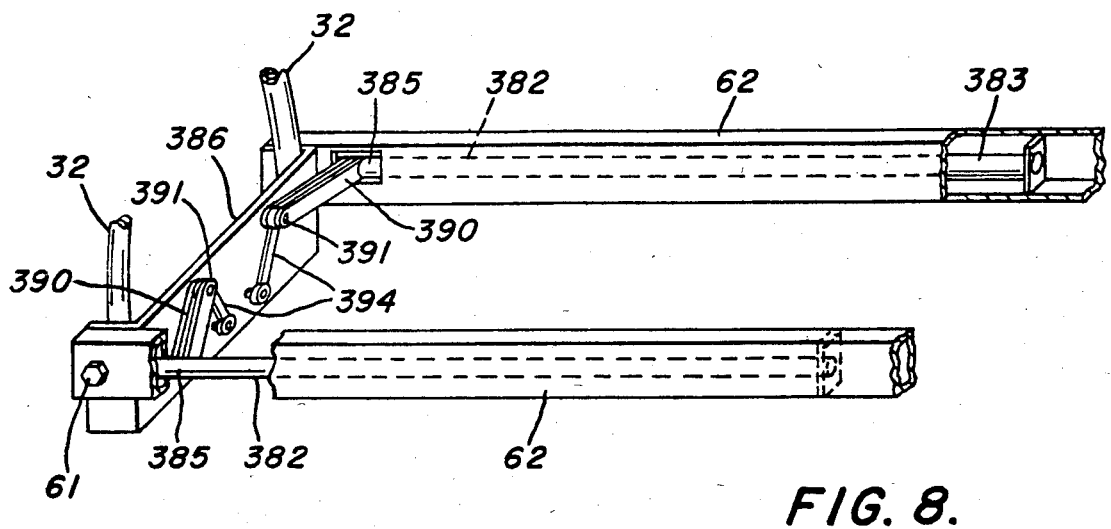
FIG. 8 is a perspective view illustrating an embodiment of the torsion suspension system wherein the torsion bars are mounted in the swing arm.

In FIG. 8, there is illustrated the mounting of torsion bars 382 in arms 62 of the swing arm 60 in accordance with the present suspension system. In this embodiment of the invention, end 383 of torsion bar 382, farthest away from swing arm pivot point 61 or closest to the rear wheel axle, is fixedly secured to arm 62. At end portion 385 of torsion bar 382 closest to the swing arm pivot point, the torsion bar is rotatably carried in arm 62. Arm member 390 has a first end thereof which is rigidly attached to torsion bar 382 near end portion 385. Arm member 390 extends from torsion bar 382 through an opening in the swing arm wall towards the second arm 62 and may extend generally parallel to the axis of the swing arm pivot point. Linkage means 394 pivotally connects second end 391 of arm member 390 to frame member 386 which is securely attached to member 32. Thus it can be seen that linkage means 394 is pivotally connected to both arm member 390 and to frame member 386. Two torsion bars may be attached to the frame essentially as described above and as shown in FIG. 8. Linkage means 394 and arm member 390 can be arranged so as to provide a rising or increasing spring rate in the torsion bar as the rear wheel deflects the swing arm upwardly. It will be understood that linkage means 394 and are member 390 may be connected so as to provide varying degrees of increasing spring rate even though the torsion bar is not changed. For example, the spring rate of the torsion bar may be increased by shortening the length of arm member 390. Thus, it will be understood that many changes in the spring rate may be made depending on the length of linkage means 394 and arm member 390. Likewise the spring rate of the suspension systems described hereinabove may be varied accordingly.

The spring rate of any of the torsion bar systems herein described may be set up so that the leverage ratio on the torsion bar can range from 8:1 to 1.5:1.

Figure 9:
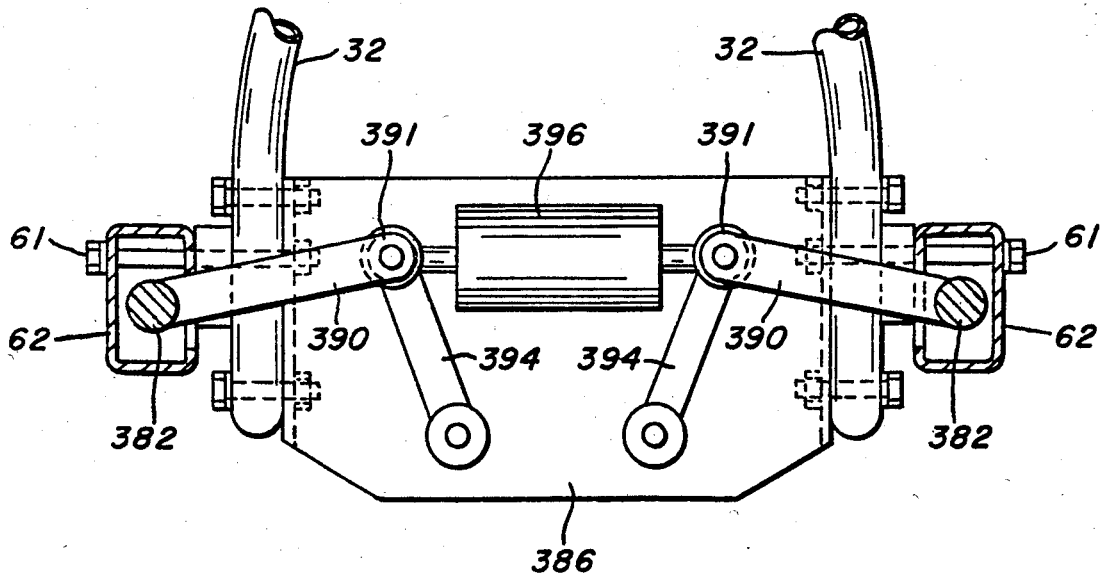
FIG. 9 is an end view showing the torsion bars of FIG. 8 having a shock absorber mounted on the linkage means so as to provide a progressive rate of damping.
Figure 10:
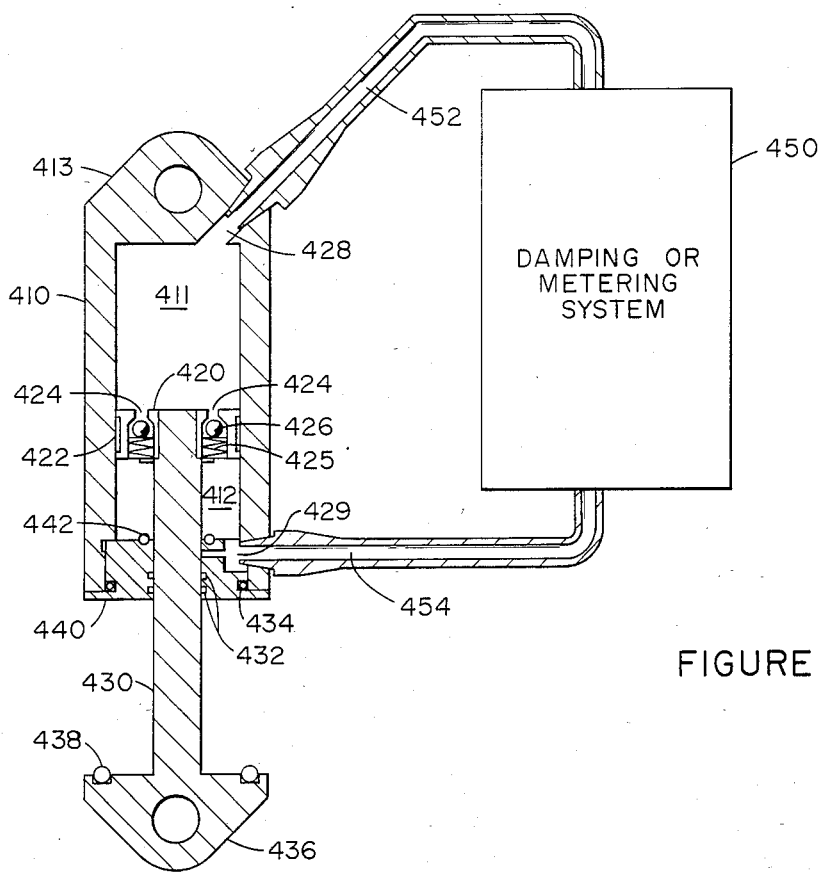
FIG. 10 is a sectional view of a shock absorber body showing a damping or metering system exterior to the shock body.
Figure 11:
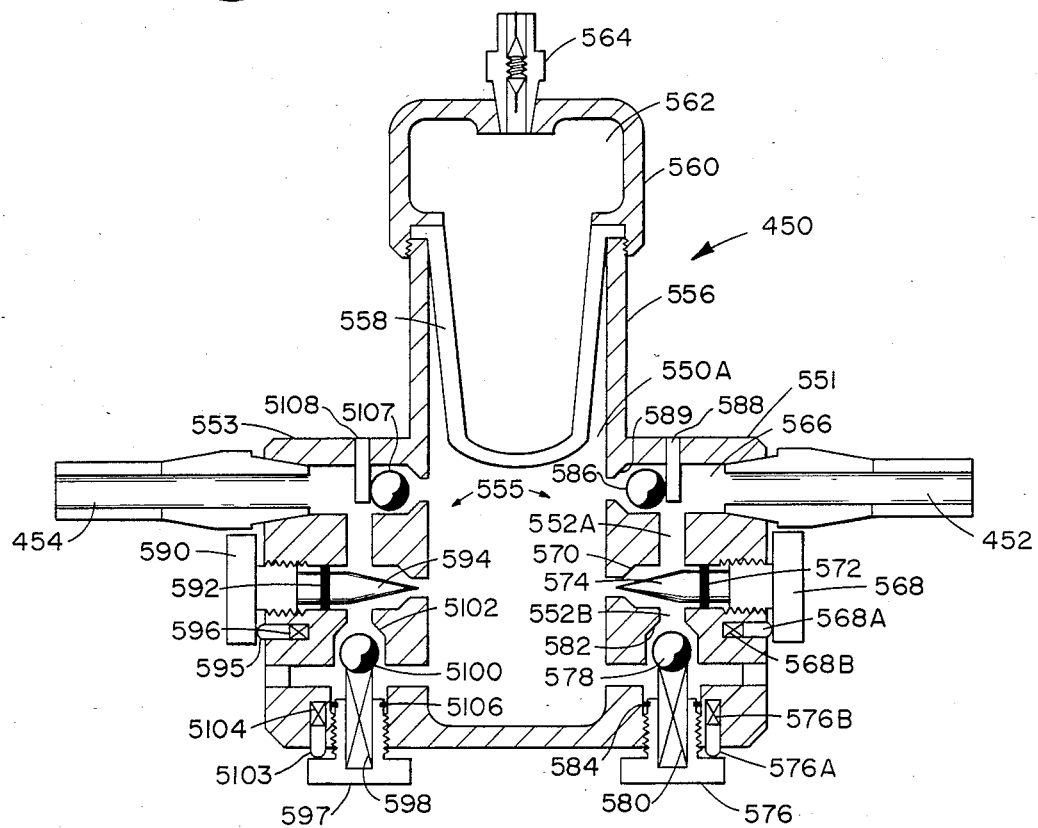
FIG. 11 is a detailed sectional view of the damping or metering system of FIG. 10.

In FIG. 9, it can be seen that a hydraulic shock absorber may be mounted so as to provide damping in the suspension systems. The shock absorber may be mounted as shown in FIG. 9 so as to provide increasing damping which can be substantially at the same rate of change as that of the spring rate of the torsion bar. However, since the shock absorber is essentially separate from the torsion bar, it may be set up so as to increase or decrease damping with respect to the spring rate of the torsion bar. Thus, it will be noted that, as compared to conventional coiled spring/shock absorber combination, the suspension systems of the present invention have the advantage of being able to increase or decrease damping or rebound damping independent of the spring rate of the suspension system.

In FIG. 9, shock absorber 396 is shown attached to ends 391 of arm members 390. It will be appreciated that other mounting positions for shock absorber 396 may be employed.

In the suspension system of the present invention, the amount of travel afforded the rear wheel can vary depending on the terrain over which the motorcycle travels. For example, if the motorcycle is of the type used in competition such as motocross, the torsion suspension can be set to provide as much as 13 or 14 inches of travel. If the use is for road riding then the suspension can provide 5, 6 or 7 inches of travel, for example.

For purposes of getting longer torsion bars, the torsion bars mounted as shown in FIGS. 8 and 9 may be connected by lever arms and linkage to torsion bars mounted under the motor, for example, providing a progressive spring rate all of which are contemplated within the purview of the present invention.

In another aspect of the present suspension system hereindescribed, it will be understood that it permits redesign of the motorcycle particularly for purposes of lowering or improving its center of gravity. The lowered center of gravity makes for ease of handling and provides significant benefits with respect to weight distribution. In motorcycles such as used in competition such as motocross, the suspension, as noted earlier, is designed to have travel of about 12 inches. This travel results in gas tanks being located a greater distance from the ground and inherently provides high weight which is undesirable. Conventional design of motorcycles do not readily permit relocation of the gas tank. This is particularly true of the single shock type motorcycle. Thus, there remains weight in the order of 20 to 30 pounds particularly when the gas tank is full which adversely affects handling characteristics and gives rise to an apparent increase in weight.

Figure 1A:
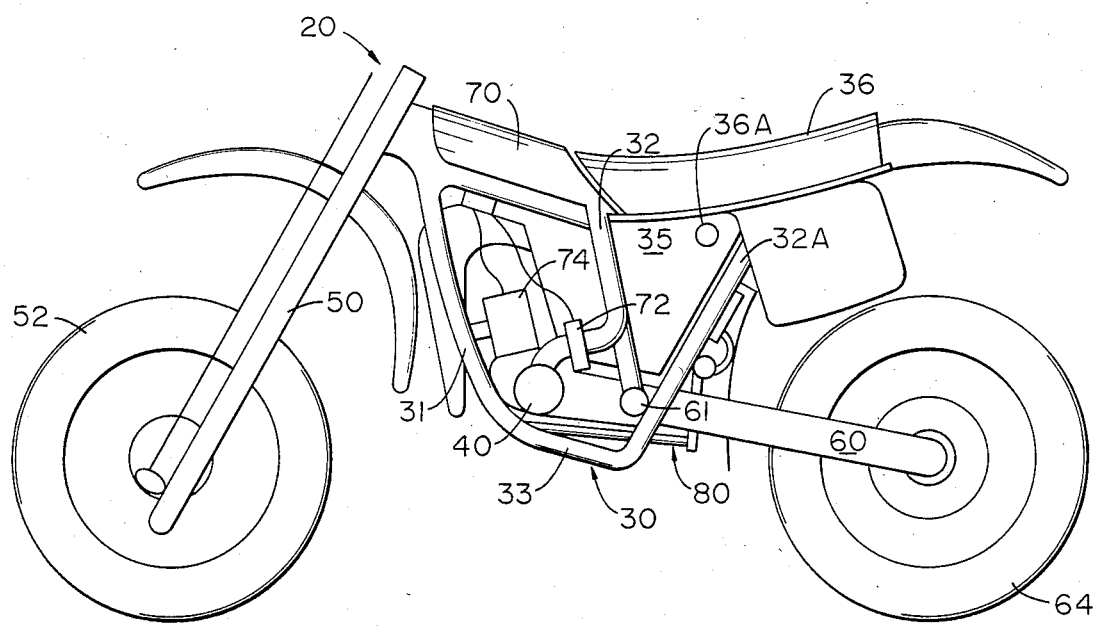
FIG. 1a is a side elevation view of a motorcycle schematically illustrating the use of the torsion suspension and a gas tank located under a seat in accordance with the present invention.

The present invention now permits redistribution of this high weight by relocating a large portion of the gas tank 35 below the seat 36 as shown in FIGS. 1 and 1A. The gas tank may be shaped as shown in FIG. 1 to conveniently fit between frame members 32 and 32A. A gas cap 35A, having a cover 36A may be provided for adding gasoline. A gasoline pump (not shown) of conventional design can be used to carry gasoline to carburator 72. Air cleaner 70 can be located in the appropriate housing on top of frame member 34 and air carried therefrom to the carburator along conduit 70A. It will be appreciated that while carburator 72 is shown mounted directly behind cylinder 74 it may be mounted to the side for ease of access. If carburator 72 is mounted to the side of cylinder 74 (FIG. 1A) then gas tank 35 may be extended further forward and closer to cylinder 74 as shown in FIG. 1A. Gas tank 35 can be suitably molded around carburator 72.

In FIG. 1A, carburator 72 is shown accessing the motor 40 through a side member in a manner conventionally used in two-stroke motors using a rotary valve. Air to carburator 72 can be carried via tubing or frame member 32 from air chamber 70A. A gas cap 36A may be located on the side of the gas tank (FIG. 1A) or on the top of the gas tank beneath air chamber 70A. Thus, it can be seen that having a large portion of gas tank located underneath at least part of the seat greatly reduces the center of gravity of the motorcycle and greatly improves handling.

Thus having described preferred embodiments of the invention, it will be understood that certain parts may be changed or modified and that such are contemplated to be within the scope of the invention. Further, while the invention has been described in terms of preferred embodiments, the claims appended hereto are intended to encompass other embodiments which fall within the spirit of the invention.

What is claimed is:

1. A motorcycle having an improved center of gravity, the motorcycle having:
   (a) a torsion bar suspension system;
   (b) a frame having a front and rear wheels with a motor located in said frame and a driver's seat mounted on said frame;
   (c) a swing arm having a pivot point on one of the frame and the motor, comprises at least one arm supporting a wheel, the swing arm permitting the wheel to rotate about a generally horizontal axis and to move in a generally vertical direction with respect to the pivot point axis of said swing arm;
   (d) a torsion bar suspension member having a first end portion and a second end portion and mounted at an angle with respect to the pivot point axis, the first end portion secured to one of said frame and said motor, and said second end portion being rotatably carried by one of said frame and said motor;
   (e) a lever arm having a first end and a second end, the first end rigidly attached to said torsion bar; and
   (f) a linkage means pivotally connected to said swing arm and to said second end of said lever arm, said swing arm, linkage means, lever arm and torsion bar connected such that movement of the swing arm displaces said linkage means thereby forcing said lever arm to twist said torsion bar, the linkage means and the lever arm connected so as to provide an apparent increase in spring rate of the torsion bar as the wheel displaces the swing arm; and
   (g) a fuel tank having at least a portion thereof fixedly mounted in said frame below said driver's seat.

2. The suspension system in accordance with claim 1 wherein the torsion bar suspension member is mounted at an angle of at least 5° with respect to the axis of the pivot point.

3. The suspension system in accordance with claim 1 wherein the torsion bar suspension member is mounted at an angle between 60° and 120° with respect to the axis of the pivot point.

4. The suspension system in accordance with claim 1 wherein the torsion bar suspension member is mounted generally perpendicular with respect to the axis of the pivot point.

5. The suspension system in accordance with claim 1 wherein the linkage means includes a member pivotally fastened to both the swing arm and to the second end of the lever arm.

6. The suspension system in accordance with claim 1 wherein the torsion member is mounted under said motor and extended generally perpendicularly towards the axis of the pivot point of the swing arm.

7. The suspension system in accordance with claim 1 wherein the swing arm has two arms two arms for supporting said wheel and a cross-member is provided therebetween and secured to each arm and said linkage means is pivotally connected to said cross-member.

8. The suspension system in accordance with claim 1 wherein the linkage means includes an adjustable linkage member for purposes of changing the apparent increase in the spring rate of said torsion bar.

9. The suspension system in accordance with claim 1 wherein the length of the lower arm is adjustable for purposes of changing the spring rate of said torsion bar.

10. The suspension system in accordance with claim 1 including a hydraulic shock absorber having one end thereof connected to said linkage means and having an apposed end attached to said frame.

11. The suspension system in accordance with claim 1 including a hydraulic shock absorber having an end thereof connected to said swing arm and having an opposed end connected to said frame.

12. The suspension system in accordance with claim 1 including a hydraulic shock absorber and linkage means connecting the shock absorber to the swing arm, the shock absorber responsive to the generally up and down movement of the swing arm as it is deflected by the wheel.

13. The suspension system in accordance with claim 1 including a hydraulic shock absorber and linkage means connecting the shock absorber to the frame and the swing arm, the linkage means connecting said swing arm so as to change the rate of damping in said shock absorber as the swing arm is deflected upwardly.

14. A motorcycle having an improved center of gravity, the motorcycle having:
   (a) a torsion bar suspension system;
   (b) a frame having a front and rear wheel with a motor located in said frame and a driver's seat mounted on said frame;
   (c) a swing arm having a pivot point on one of the frame and the motor, comprises at least one arm supporting a wheel, the swing arm permitting the wheel to rotate about a generally horizontal axis and to move in a generally vertical direction with respect to the pivot point axis of said swing arm;
   (d) a torsion bar suspension member having a first end portion and a second end portion and mounted at an angle with respect to the pivot point axis, the first end portion secured to one of said frame and said motor, and said second end portion being rotatably carried by one of said frame and said motor;
   (e) a lever arm having a first end and second end, the first end rigidly attached to said torsion bar; and
   (f) a linkage means pivotally connected to said swing arm to said second end of said lever arm, said swing arm, linkage means, lever arm and torsion bar connected such that movement of the swing arm displaces said linkage means thereby forcing said lever arm to twist said torsion bar, the linkage means and the lever arm connected so as to provide an apparent increase in spring rate of the torsion bar as the wheel displaces the swing arm; and
   (g) a shock absorber mounted on said linkage means so as to provide an increased rate of damping in response to the wheel displacing the swing arm.
   (h) a fuel tank having at least a portion thereof fixedly mounted in said frame below said driver's seat.

15. The suspension system in accordance with claim 14 wherein the torsion bar suspension member is mounted at an angle in the range of 60° to 120° with respect to the axis of the pivot point.

16. The suspension system in accordance with claim 14 wherein the torsion bar suspension member is mounted generally perpendicular with respect to the axis of the pivot point.

17. The suspension system in accordance with claim 14 wherein the torsion bar suspension member is mounted generally parallel of the axis of the swing arm pivot point.

18. In a motorcycle having an improved center of gravity,
   (a) a torsion suspension system;
   (b) a frame having front and rear wheels with a motor located in said frame and a driver's seat mounted on an upper supporting structure of said frame;
   (c) a swing arm having a pivot point on one of the frame and the motor is provided, the swing arm having at least one arm supporting a wheel, the swing arm permitting the wheel to rotate about a generally horizontal axis and to move in a generally vertical direction with respect to the pivot point axis of said swing arm; and
   (d) a fuel tank is provided having at least a portion thereof fixedly mounted in said frame below said driver's seat, thereby improving said motorcycle center of gravity by providing for lowered weight.

* * * * *